United States Patent [19]

Komurasaki

[11] Patent Number: 4,945,755
[45] Date of Patent: Aug. 7, 1990

[54] ACCELERATION DETECTOR WITH PARALLEL GROUND PATHS

[75] Inventor: Satosi Komurasaki, Himeji, Japan

[73] Assignee: Mitsubishi Denki Kabushiki Kaisha, Tokyo, Japan

[21] Appl. No.: 354,062

[22] Filed: May 19, 1989

[30] Foreign Application Priority Data

May 19, 1988 [JP] Japan .............................. 63-120619
Jun. 7, 1988 [JP] Japan .............................. 63-74791

[51] Int. Cl.$^5$ .............................................. G01L 23/22
[52] U.S. Cl. ......................................... 73/35; 310/329
[58] Field of Search ............................. 73/35; 310/329

[56] References Cited

U.S. PATENT DOCUMENTS

| 3,307,054 | 2/1967 | Shoor | 310/329 |
| 4,225,302 | 9/1980 | Suzuki et al. | 310/329 |
| 4,399,705 | 8/1983 | Weiger et al. | 73/35 |
| 4,637,246 | 1/1987 | Lombard et al. | 73/35 |
| 4,660,409 | 4/1987 | Miyata et al. | 73/35 |

FOREIGN PATENT DOCUMENTS 184666 6/1986 European Pat. Off. ................ 73/35

Primary Examiner—John Chapman
Attorney, Agent, or Firm—Sughrue, Mion, Zinn, Macpeak and Seas

[57] ABSTRACT

An acceleration or knocking detector for a vehicle engine includes an electrically conductive bushing 24 mounted to the engine, and an acceleration transducer assembly disposed on the bushing and including a piezoelectric element 31, an inertial weight 34, an output electrode 31a, and a ground electrode 31b in contact with the bushing. An output terminal 29a is connected to the output electrode of the transducer assembly and extends through the housing for external connection to a grounded control unit 38, and a ground terminal 29b electrically connected to the ground electrode of the transducer assembly also extends through the housing for connection to the control unit, thus establishing parallel ground paths. An electrical conduction maintaining element such as a bonding agent, tape, washer or grease is disposed between the bushing and the engine to establish and maintain good conduction therebetween for a prolonged time.

7 Claims, 3 Drawing Sheets

ACCELERATION DETECTOR WITH PARALLEL GROUND PATHS

BACKGROUND OF THE INVENTION

This invention relates to an acceleration detector and more particularly to an acceleration detector for detecting knocking in an internal combustion engine.

FIG. 1 illustrates one example of an acceleration detector to which the present invention can be applied. This acceleration detector is attached, when in use, to an internal combustion engine A by a bolt B for detecting vibration or knocking of the engine A. The acceleration detector comprises a housing 1 defining an annular cavity 2 therein and an annular acceleration transducer assembly 3 disposed within the cavity 2. The housing 1 comprises a tubular bushing 4 having a through hole 5 and a flange 6. The housing 1 also comprises a ring-shaped outer case 7 bonded to the flange 6 of the bushing 4 so that the cavity 2 is defined therein. The acceleration detector can be attached to a mounting surface C of the internal combustion engine A by the bolt B extending through the central bore 5 of the bushing 4 and thread-engaged with the engine A.

The outer case 7 also has a connector 8 radially outwardly extending from the outer case 7 so that an output terminal 9 can extend through the connector 8 for taking out an output signal from the acceleration transducer assembly 3 disposed within the cavity 2. The acceleration transducer assembly 3 further includes an annular piezoelectric element 11 placed on the terminal plate 10, a washer-shaped terminal 12 including a lead 12a connected to the output terminal 9, an electrically insulating washer 13 disposed on the washer terminal 12, an annular inertial weight 14 placed on the insulating washer 13 and a threaded ring-shaped stop nut 15 thread-engaged with the thread 4a on the tubular bushing 4. The piezoelectric element 11 includes an output electrode 11a and a reference electrode 11b. The insulating washer 13 may be made of a sheet of polyethylene terephtalate (PET), polyphenylene sulfite (PPS) or the like. An electrically insulating tape or tube 16 is placed on the tubular bushing 4 so that the acceleration transducer assembly 3 is insulated from the bushing 4 even when the washer terminal 12 as well as the piezoelectric element 11 are eccentrically assembled.

In order to resiliently support and protect the acceleration transducer assembly 3 within the cavity 2 from undesirable environmental conditions, the remaining space of the cavity 2 of the housing 1 which is not occupied by the acceleration transducer assembly 3 is substantially filled with a resilient filler material 17 of a thermo-setting resin. The filler material 17 must be sufficiently resilient after it is cured to allow the movement of the inertial weight 14 relative to the housing 1 when an acceleration is applied to the inertial weight 14 so that the piezoelectric element 11 generates a voltage signal proportional to the pressure exterted on it by the relative movement of the inertial weight 14 against the piezoelectric element 11.

When in use, the acceleration detector is securely mounted on the mounting surface C of the internal combustion engine A by the bolt B inserted into the central through hole 5 of the housing 1. The acceleration or the vibration of the internal combustion engine A produces the movement of the inertial weight 14 relative to the housing 1, which causes the piezoelectric element 11 to be stressed by the inertial weight 14, whereby an electrical signal indicative of the movement of the inertial weight 14 relative to the engine is generated from the piezoelectric element 11. The electrical signal is provided from the output electrode 11a through the washer terminal 12, the lead 12a and the output terminal 9 to be analyzed to determine as to whether or not a knocking signal which generates upon knocking of the internal combustion engine is involved. When it is determined that a knocking signal is contained in the electrical signal, the operating parameters for operating the engine can be adjusted to increase the output power or decrease the fuel consumption rate.

Since the detection signal from the piezoelectric element 11 is provided with reference to the potential level of the bushing 4 which is at equal potential to that of the reference electrode 11b of the piezoelectric element 11, it is important to establish a good electrical connection between the bushing 4 and the engine A in order to ensure that the bushing 4 is always kept at a reference potential, establishing a proper electrical connection between the bushing 4 and the engine A as shown in FIG. 2. This electrical connection is established by a direct contact between the bottom surface 6a of the flange 6 of the bushing 4 and the mounting surface C of the engine A as well as through the screw B which contacts the inner and the top surfaces 4b and 4c of the bushing 4 on one hand and the threaded portion of the engine A on the other hand.

However, when the acceleration detector is used with an automotive engine, an electrical connection between the bushing 4 and the engine A can be easily broken by rusts and oil film on the contacting surfaces between the bushing 4 and the engine A generated in a hostile environment including moisture and gas. Therefore, it is very difficult to maintain a good electrical connection between the bushing and the engine for a prolonged time period of from several to 10 years for maintaining the reference electrode 11b at the reference potential. When the electrically conducting state at the interface between the bushing 4 and the engine A is broken and the potential of the bushing 4 is not held at the reference potential of the mounting surface of the engine A, the electric circuit between the piezoelectric element 11 and the control unit becomes as illustrated in FIG. 3, where the reference potential of the piezoelectric element 11 is floating and accurate acceleration detection is impossible.

SUMMARY OF THE INVENTION

Accordingly, one object of the present invention is to provide an acceleration detector free from the above discussed problems.

Another object of the present invention is to provide an acceleration detector in which a reference electrode of the transducer can be properly connected to ground.

A further object of the present invention is to provide an acceleration detector in which a good electrical connection between the acceleration detector and the engine can be maintained.

With the above objects in view, the acceleration detector of the present invention comprises a housing defining a cavity therein and including an electrically conductive bushing which is brought into contact, when in use, with an object such as an engine of which vibration is to be detected. An acceleration transducer assembly is disposed on the bushing and includes a piezoelectric element, an inertial weight, an output electrode and a reference electrode in contact with the bushing. The detector comprises an output terminal connected to the output electrode of the transducer assembly and extending through the housing for external connection and a ring-shaped ground terminal electrically connected to the reference electrode of the transducer assembly and extending through the housing for external connection. The ground terminal is disposed between and in contact with the bushing and the piezoelectric element. An electrical conduction maintaining element such as electrically conductive bonding agent, tape, washer and grease may be inserted when in use between the bushing and the engine to be detected for establishing and maintaining a good electrical conduction therebetween for an elongated time.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
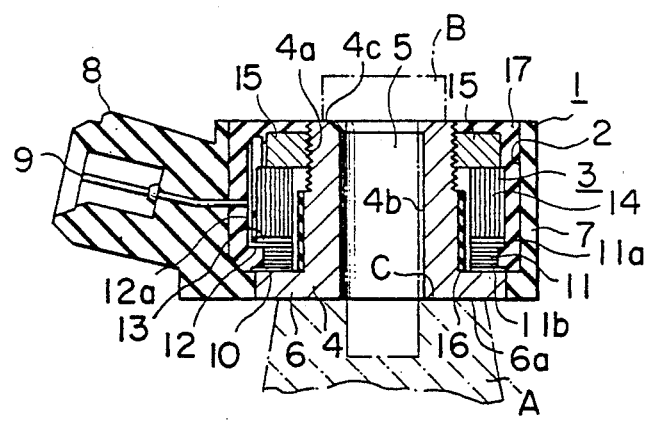
FIG. 1 is a sectional view showing one example of an acceleration detector to which the present invention can be applied.
Figure 2:
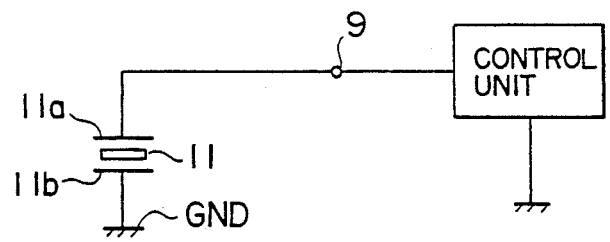
FIG. 2 is a schematic circuit diagram of the acceleration detector shown in FIG. 1 when an electrical connection between the bushing and the engine is properly established.
Figure 3:
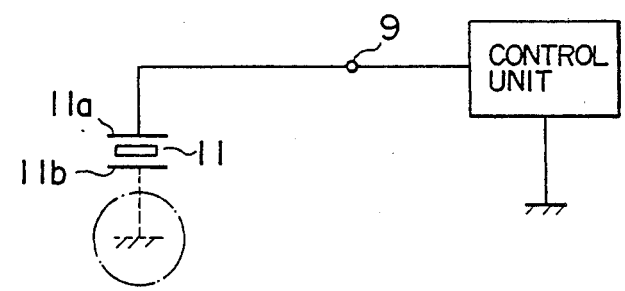
FIG. 3 is a schematic circuit diagram of the acceleration detector shown in FIG. 1 when an electrical connection between the bushing and the engine is broken.
Figure 4:
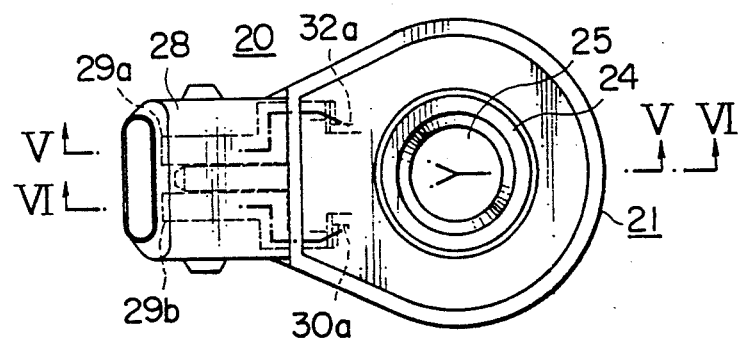
FIG. 4 is a plan view of the acceleration detector of the present invention.
Figure 5:
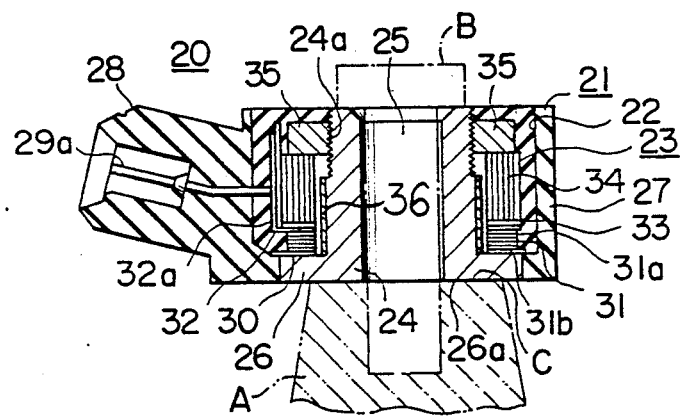
FIG. 5 is a sectional side view of the acceleration detector taken along line V—V of FIG. 4.
Figure 6:
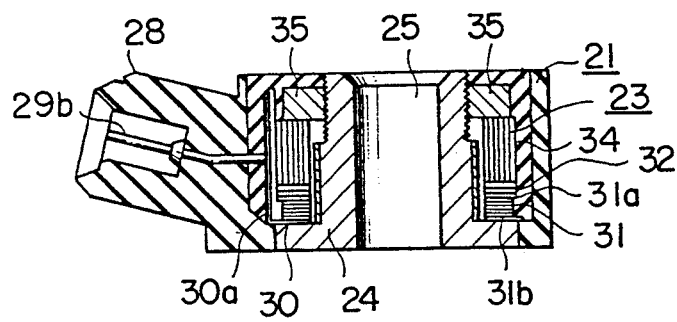
FIG. 6 is a sectional side view of the acceleration detector taken along line VI—VI of FIG. 4.

FIGS. 4 to 7 illustrate an acceleration detector 20 of the present invention which can be attached to an internal combustion engine A by a bolt B for detecting vibration or knocking of the engine. The acceleration detector 20 comprises a ring-shaped housing 21 defining an annular cavity 22 therein and an annular acceleration transducer assembly 23 disposed within the cavity 22.

The housing 21 comprises a tubular bushing 24 having a central through hole 25 and a flange 26. The housing 21 also comprises a ring-shaped outer case 27 connected to the flange 26 of the bushing 24 so that the cavity 22 is defined therein. The acceleration detector 20 can be attached to the mounting surface C of the internal combustion engine A by the screw B extending through the central bore 25 of the bushing 24 and thread-engaged with the engine A.

According to the present invention, the outer case 27 also has a connector 28 radially outwardly extending from the outer case 27 so that an output terminal 29a and a ground terminal 29b (FIGS. 4 and 6) can extend through the connector 28 for taking out an output signal from the acceleration transducer assembly 23 disposed within the cavity 22. The acceleration transducer assembly 23 includes a washer shaped terminal plate 30 connected to the ground terminal 29b through a lead 30a integrally extending from the terminal plate 30. The terminal plate 30 is placed on the flange 26 of the bushing 24. The acceleration transducer assembly 23 further includes an annular piezoelectric element 31 including an output electrode 31a and a reference electrode 31b placed on and in electrical contact with the terminal plate 30, a washer-shaped terminal 32 including a lead 32a connected to the output terminal 29a, an electrically insulating washer 33 disposed on the washer terminal 32, an annular inertial weight 34 and the threaded ring-shaped stop nut 35 thread engaged with the thread 24a on the tubular housing 24. An electrically insulating tube 36 is placed on the tubular bushing 24 so that the acceleration transducer assembly 23 is insulated from the bushing 24 even when the washer terminals 30 and 32 are eccentrically assembled.

Figure 7:
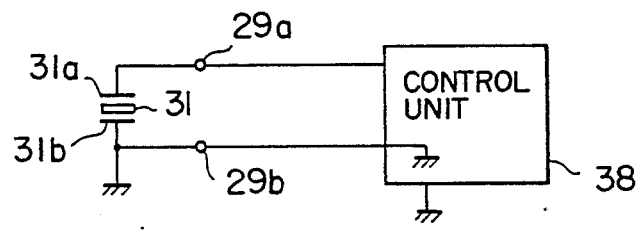
FIG. 7 is a schematic circuit diagram of the accelerator detector of the present invention shown in FIGS. 4 to 6.

FIG. 7 illustrates a circuit around the acceleration detector 20 of the present invention when in use, from which it is seen that the output electrode 31a of the piezoelectric element 31 of the acceleration detector 20 is connected to the output terminal 29a and the reference electrode 31b of the element 31 is connected to the ground terminal 29b. Since the electrically conductive bushing 24 on which the piezoelectric element 31 is placed is in contact with the engine A, the reference electrode 31b of the element 31 is also grounded through the bushing 24. The output and ground terminals 29a and 29b are connected to a control unit 38 for processing the output signal from the detector to determine an occurrence of knocking in the engine A for example. The ground terminal 29b is connected to ground through the control unit 38.

According to the present invention, the acceleration detector is provided with a ground terminal connected to the reference electrode of the piezoelectric element, so that a stable and reliable gounding circuit can be provided. Therefore, an accurate and reliable acceleration detector having a superior detection sensitivity can be obtained.

It is to be noted that the above-described grounding circuit is not interfered with by the power circuits such as an engine controlling, starting circuit, a charging circuit and an ignition circuit. This is because the power circuit system and the electronic control circuit system have the grounding circuit system of different electrical wiring. Also, in a control system, such as a knocking control system, employing an acceleration detector of this type, a band pass filter is used to selectively process the signal having a central frequency at about several KHz~about ten KHz.

Figure 8:
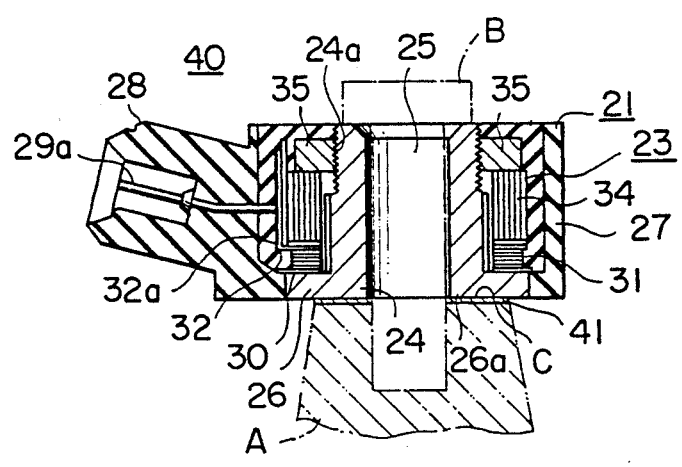
FIG. 8 is a sectional side view illustrating another embodiment of the present invention.

FIG. 8 illustrates another embodiment of the acceleration detector 40 of the present invention, in which an electrical conduction maintaining means 41 is disposed between the bushing and the engine A for establishing a good electrical conduction therebetween. In the illustrated embodiemnt, the electrical conduction maintaining means 41 is inserted between the bottom surface 26a of the flange portion 26 of the bushing 24 and the mounting surface C of the engine A. The conduction maintaining means 41 may be an electrically conductive bonding agent commercially available from Grace Japan K.K. under the trade name C-770-4 (volumetric resistance=0.001 Ωcm) or C-930-55-7 (volumetric resistance=0.005 Ωcm). Also, an electrically conductive bonding agent sold from Nagase-Chiba K.K. under the trade name XNR5302, XNR5303 or XNR5350 (volumetric resistances are $5\times10^{-4}$, $1\times10^{-4}$ and $2\times10^{-4}$ $\Omega$cm, respectively) may be used. The electrical conduction maintaining means 41 for establishing a good electrical contact between the bushing 24 and the engine A may also be an electrically conductive tape such as Sumitomo-3M No. 1170 and No. 1181, an electrically conductive washer No. 1245. Alternatively, a grease for preventing formation of an electrically insulating substance may be used as electrical conduction maintaining means 41. While grease itself is basically electrically insulating, an electrical conduction can be established and maintained when applied as a thin film because the thin film breaks when the bottom contacting surface 26a of the bushing 24 is pressed against the mounting surface C of the engine A during assembly and these surfaces are protected by the grease film from being contaminated.

What is claimed is:

1. An acceleration detector attached to an electrically conductive object for detecting accelerations thereof, comprising:
    a housing (21) defining a cavity (22) therein and including an electrically conductive bushing (24) mounted in contact with the object;
    an acceleration transducer assembly (23) disposed on said bushing in said cavity and including a piezoelectric element (31), an inertial weight (34), an output electrode (31a) and a reference electrode (31b) in contact with said bushing;
    securing means (35) for securing said transducer assembly to said housing;
    a resilient filler material applied around said acceleration transducer assembly for resiliently sealing said acceleration transducer assembly from the exterior, said resilient filler material being sufficiently resilient to allow the movement of said inertial weight relative to said housing when an acceleration is applied to said inertial weight;
    an output terminal (29a) connected to said output electrode of said transducer assembly and extending through said housing for external connection to a grounded control unit (38); and
    a ground terminal (29b) electrically connected to said reference electrode of said transducer assembly and extending through said housing for external connection to said control unit to establish parallel paths to ground through said object and through said control unit.

2. An acceleration detector as claimed in claim 1, wherein said reference electrode includes an electrically conductive ring-shaped member disposed between and in contact with said bushing and said piezoelectric element.

3. An acceleration detector as claimed in claim 1, further comprising electrical conduction maintaining means disposed between said bushing and the object for maintaining a good electrical conductive relationship therebetween.

4. An acceleration detector as claimed in claim 3, wherein said electrical conduction maintaining means comprises an electrically conductive bonding agent.

5. An acceleration detector as claimed in claim 3, wherein said electrical conduction maintaining means comprises an electrically conductive tape.

6. An acceleration detector as claimed in claim 3, wherein said electrical conduction maintaining means comprises an electrically conductive washer.

7. An acceleration detector as claimed in claim 3, wherein said electrical conduction maintaining means comprises electrically conductive grease.

* * * * *